(12) United States Patent
Chino et al.

(10) Patent No.: US 10,899,778 B2
(45) Date of Patent: Jan. 26, 2021

(54) SILANE COMPOUND, RUBBER COMPOSITION AND TIRE

(71) Applicant: ENEOS CORPORATION, Tokyo (JP)

(72) Inventors: Keisuke Chino, Tokyo (JP); Hiroaki Suzuki, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 42 days.

(21) Appl. No.: 16/084,413

(22) PCT Filed: Mar. 13, 2017

(86) PCT No.: PCT/JP2017/010030
§ 371 (c)(1),
(2) Date: Sep. 12, 2018

(87) PCT Pub. No.: WO2017/159633
PCT Pub. Date: Sep. 21, 2017

(65) Prior Publication Data
US 2019/0085003 A1    Mar. 21, 2019

(30) Foreign Application Priority Data

Mar. 14, 2016 (JP) .................. 2016-049690

(51) Int. Cl.
| | |
|---|---|
| C07F 7/18 | (2006.01) |
| B60C 1/00 | (2006.01) |
| C08K 5/5435 | (2006.01) |
| C08K 3/22 | (2006.01) |
| C08K 3/36 | (2006.01) |
| C08K 3/00 | (2018.01) |
| C08L 21/00 | (2006.01) |
| C08K 5/54 | (2006.01) |

(52) U.S. Cl.
CPC .............. *C07F 7/1804* (2013.01); *B60C 1/00* (2013.01); *C07F 7/18* (2013.01); *C08K 3/00* (2013.01); *C08K 3/22* (2013.01); *C08K 3/36* (2013.01); *C08K 5/54* (2013.01); *C08K 5/5435* (2013.01); *C08L 21/00* (2013.01); *C08K 2003/2296* (2013.01)

(58) Field of Classification Search
CPC . C07C 7/1804; B60C 1/00; C07F 7/18; C07F 7/1804; C08K 3/00; C08K 3/22; C08K 3/36; C08K 5/54; C08K 5/5435; C08K 2003/2296; C08L 21/00
USPC ......................................................... 524/432
See application file for complete search history.

(56) References Cited

U.S. PATENT DOCUMENTS

| | | |
|---|---|---|
| 4,705,868 A | 11/1987 | Deschler et al. |
| 5,534,599 A | 7/1996 | Sandstrom et al. |
| 2005/0009979 A1 | 1/2005 | Tanaka et al. |

FOREIGN PATENT DOCUMENTS

| | | |
|---|---|---|
| CN | 1141311 | 1/1997 |
| CN | 1966577 | 5/2007 |
| EP | 1 479 698 | 11/2004 |
| JP | 54-107999 | 8/1979 |
| JP | 62-96495 | 5/1987 |
| JP | 8-259736 | 10/1996 |
| JP | 11-335381 | 12/1999 |
| JP | 2005-8870 | 1/2005 |
| JP | 2005-10476 | 1/2005 |
| JP | 2006-52310 | 2/2006 |
| JP | 2009-269981 | 11/2009 |

OTHER PUBLICATIONS

JP 2009-269981 A, machine translation, EPO espacenet. (Year: 2009).*
CAS Registry No. 3388-04-3, SciFinder®, American Chemical Society . (Year: 2020).*
Extended European Search Report dated Aug. 21, 2019 in corresponding European Patent Application No. 17766633.6.
International Search Report dated May 23, 2017 in International Application No. PCT/JP2017/010030.
Crivello, James V. et al., "Synthesis and Cationic Photopolymerization of Novel Monomers Based on Dicyclopentadiene", Chemistry of Materials, 2000, 12(12), p. 3674-3680, p. 3675, table 1, compound V.

(Continued)

*Primary Examiner* — Josephine L Chang
(74) *Attorney, Agent, or Firm* — Wenderoth, Lind & Ponack, L.L.P.

(57) ABSTRACT

Disclosed are a silane compound of the general formula (1) described below, as well as a rubber composition including the same, and a tire. A silane compound of the general formula (1) is useful because of its ability to provide a silane compound comprising: a reactive functional group having a high reactivity with an organic polymer material such as rubber, and having a low polarity; and a hydrolyzable group having a high reactivity with an inorganic material such as silica or glass. The symbols in the formula are defined in the specification.

(1)

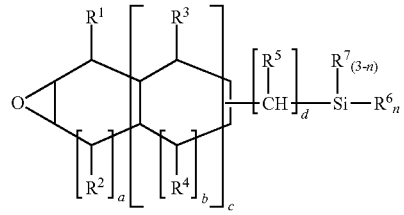

7 Claims, 1 Drawing Sheet

(56) References Cited

OTHER PUBLICATIONS

International Preliminary Report on Patentability dated Sep. 27, 2018 in International Application No. PCT/JP2017/010030.
Notice of Reasons for Refusal dated Aug. 16, 2019 in corresponding Japanese Patent Application No. 2016-049690, with English Translation.
Office Action dated Apr. 29, 2020 in corresponding Chinese Patent Application No. 201780013970.7 with English-language translation.
English Abstract of Gailiunas et al., "Oxidation of alkenylalkoxysilanes by hydroperoxides, catalyzed by molybdenum and vanadium compounds", Zhurnal Obshchei Khimii, 1979, 49(8), p. 1798-1801, p. 1799, compounds XIV, XVIII, XIX, previously cited in an IDS filed Sep. 12, 2018.
Office Action dated May 7, 2019 in corresponding Japanese Patent Application No. 2016-049690, with English translation.

\* cited by examiner

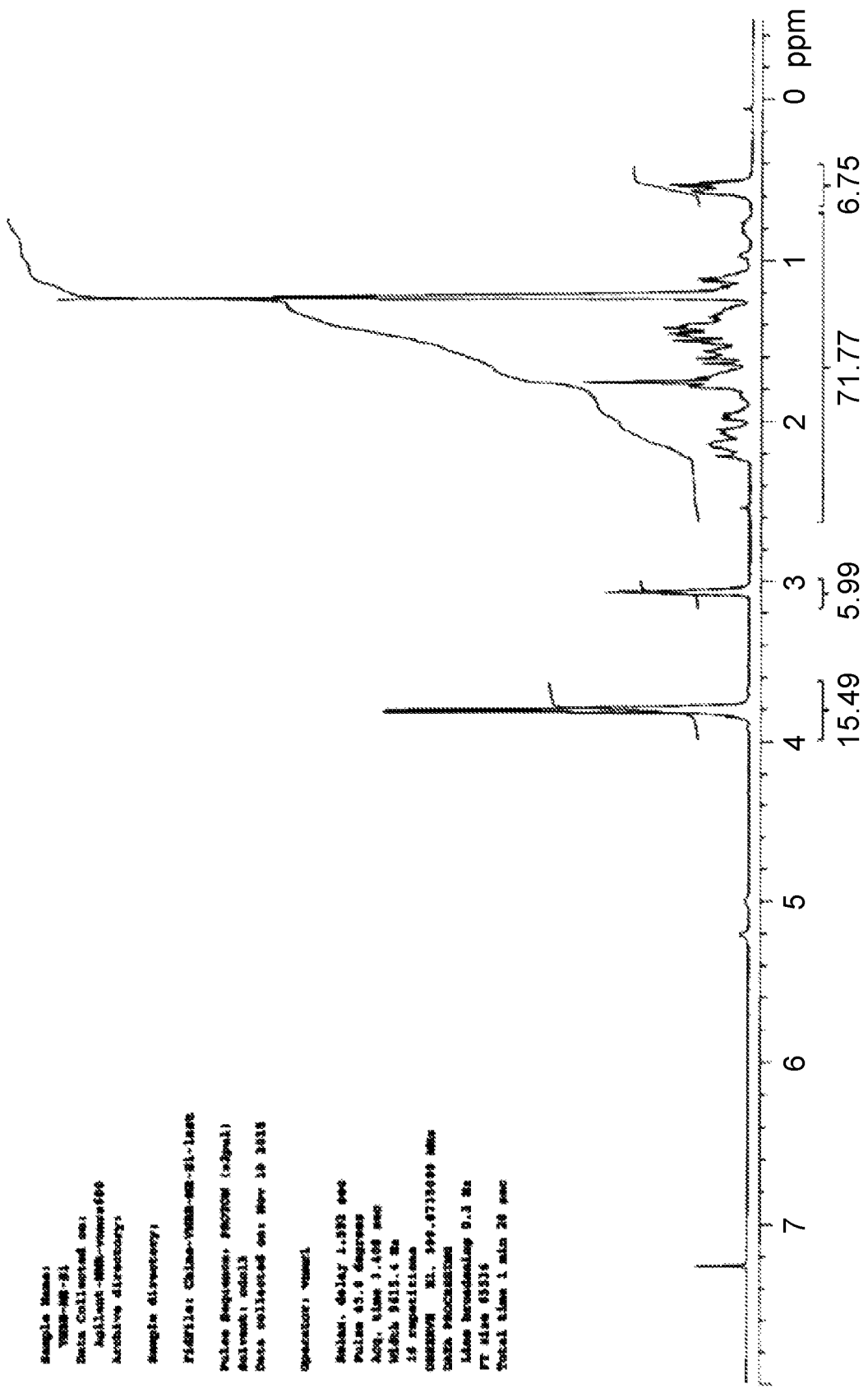

SILANE COMPOUND, RUBBER COMPOSITION AND TIRE

CROSS-REFERENCE TO RELATED APPLICATIONS

This patent application is accompanied by a priority claim based on Japanese Patent Application No. 2016-049690 (filed on Mar. 14, 2016), which is the Japanese patent application previously filed. The entire disclosure in a previous patent application is herein incorporated by reference.

FIELD OF THE INVENTION

The present invention relates to a silane compound, a rubber composition comprising the same, and a tire. More specifically, this invention relates to a low-polarity silane compound having a high reactivity with an organic polymer material such as rubber, and having a high affinity with a low-polarity polymer material; a rubber composition comprising the same; and a tire.

BACKGROUND OF THE INVENTION

Conventionally, a silane compound having a reactive functional group and a hydrolyzable group, has been employed as a component of a silane coupling agent for improving the dispersibility of organic polymer materials such as rubber; and inorganic materials such as silica in a rubber composition. Such a silane compound has also been used as an adhesion aid for improving adhesion to an inorganic material such as glass, in an adhesive composition or a sealing agent composition.

Typically, such a silane compound has a substituent such as, e.g. a mercapto group, a polysulfide group, an amino group or an epoxy group as a reactive functional group having a high reactivity with organic polymer materials such as rubber; and has a substituent, e.g. an alkoxysilyl group as a hydrolyzable group having a high reactivity with inorganic materials such as silica or glass. For example, Japanese Unexamined Patent Application Publication No. H08-259736 (Patent Document 1) discloses a polysulfide-based silane coupling agent. Japanese Unexamined Patent Application Publication No. H11-335381 (Patent Document 2) discloses a silane compound having an amino group as a reactive functional group and a methoxy group as a hydrolyzable group.

PRIOR ART DOCUMENT

Patent Document

Patent Document 1: Japanese Unexamined Patent Application Publication No. H08-259736
Patent Document 2: Japanese Unexamined Patent Application Publication No. H11-335381

SUMMARY OF THE INVENTION

Problems to be Solved by the Invention

Unfortunately, when mixed with a low-polarity polymer material, a high-polarity reactive functional group possessed by the silane compound disclosed in Patent Document 1 and Patent Document 2, has less affinity between a silane compound and an organic polymeric material, and therefore tends to cause insufficient dispersion or deficient mixing.

Also, adding such a silane compound to an adhesive or a sealing agent, leads to a decreased affinity between the silane compound and an organic polymeric material, and thus tending to cause a decreased adhesiveness with the inorganic material. The addition of a conventional silane compound having a low-polarity reactive functional group, for the purpose of enhancing affinity with an organic polymer material, however, leads to a low reactivity with an organic polymer material, thus resulting in an insufficient performance as a silane coupling agent and an adhesion aid.

The present invention has been made in view of the problems described above. The main objective of the present invention is to provide a silane compound comprising a reactive functional group having a high reactivity with an organic polymer material such as rubber, and having a low polarity; and a hydrolyzable group having a high reactivity with an inorganic material such as silica or glass.

Solution to Problem

A silane compound of the present invention is characterized by being represented by the general formula (1) described below:

(1)

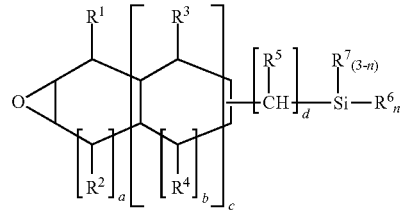

(wherein $R^1$ and $R^2$ each independently represent hydrogen or an alkyl group; wherein $R^1$ and $R^2$ may form a crosslinked structure represented by —$(CH_2)_e$—;
$R^3$ and $R^4$ each independently represent hydrogen or an alkyl group; wherein $R^3$ and $R^4$ may form a crosslinked structure represented by —$(CH_2)_f$—;
$R^5$ is hydrogen or an alkyl group;
$R^6$ is an alkoxy group, or an amino group substituted with one or more alkyl groups;
$R^7$ is hydrogen or an alkyl group;
a is an integer of 0 to 5;
b is an integer of 0 to 5;
c is an integer of 0 to 10;
d is an integer of 0 to 30;
e and f are each independently an integer of 1 to 5;
n is an integer of 1 to 3; and
in cases where c=0 and d=2, at least one $R^5$ is an alkyl group).

In the embodiments described above, b is preferably an integer of 0 to 3.
In the embodiments described above, c is preferably an integer of 1 to 5.

A rubber composition of the present invention is characterized by comprising a silane compound of the present invention, an elastomeric polymer and an inorganic material.

The embodiments described above preferably further comprise a silane compound represented by the general formula (2) described below:

(2)

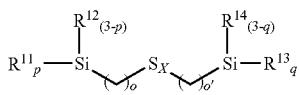

[Chem 2]

(wherein X is an integer of 2 to 20;
o and o' are each independently an integer of 1 to 10;
p and q are each independently an integer of 1 to 3;
$R^{11}$ and $R^{13}$ are each independently an alkoxy group, or an amino group substituted with one or more alkyl groups; and
$R^{12}$ and $R^{14}$ are each independently hydrogen or an alkyl group).

In the embodiments described above, the content of silane compound of the present invention in a rubber composition is, per 100 parts by mass of an elastomeric polymer, preferably 0.1 to 30 parts by mass.

A tire of the present invention is characterized by comprising a rubber composition of the present invention.

Advantageous Effects of Invention

According to the present invention, a low-polarity silane compound having a high reactivity with an organic polymer material such as rubber, and having a high affinity with a low-polarity polymer, can be provided.

BRIEF DESCRIPTION OF THE DRAWINGS

FIG. 1 shows a $^1$H-NMR chart of the silane compound 1 synthesized in Example 1.

DETAILED DESCRIPTION OF THE INVENTION

Unless otherwise indicated, "parts", "%" and the like indicating blending are by mass herein.
<Silane compounds>

A silane compound of the present invention is represented by the general formula (1) described below: A silane compound of the present invention, comprising a reactive functional group having a high reactivity and a low polarity, and a hydrolyzable group; even when mixed with a low-polarity polymer material, does not lead to an insufficient dispersion or deficient mixing, and therefore can be suitably used as a silane coupling agent or a component of a rubber composition. Also, it can also be suitably used as a component of an adhesive composition or a sealing agent composition.

(1)

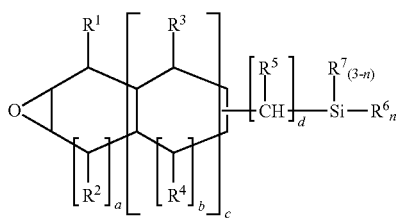

[Chem 3]

In the general formula (1) described above, a and b are each independently an integer of 0 to 5, more preferably an integer of 0 to 3, even more preferably 0 or 1, and particularly preferably 1.

It is to be noted that, in cases where c is 2 or greater, b is each independently selected.

In the general formula (1) described above, c is an integer of 0 to 10, more preferably an integer of 1 to 5, and even more preferably an integer of 1 to 3.

In the general formula (1) described above, d is an integer of 0 to 30, more preferably an integer of 0 to 10, and even more preferably an integer of 0 to 5.

In the general formula (1) described above, n is an integer of 1 to 3.

In the general formula (1) described above, $R^1$ and $R^2$ each independently represent hydrogen or an alkyl group; wherein $R^1$ and $R^2$ may form a crosslinked structure represented by $-(CH_2)_e-$. Wherein e is an integer of 1 to 5, and more preferably an integer of 1 to 3.

In the general formula (1) described above, $R^3$ and $R^4$ each independently represent hydrogen or an alkyl group; wherein $R^3$ and $R^4$ may form a crosslinked structure represented by $-(CH_2)_f-$. Wherein f is an integer of 1 to 5, and more preferably an integer of 1 to 3.

It is to be noted that, in the general formula (1), in cases where a is equal to or greater than c, $R^3$ and $R^4$ are each independently selected. Also, in cases where b is 2 or greater, $R^4$ is each independently selected.

It is to be noted that, in cases where c is 1 or greater, and b is 2 or greater, there are two or more $R^4$'s; whereas only the $R^4$ located at any one position can form a crosslinked structure with $R^3$; and other $R^4$ is hydrogen or an alkyl group.

In the general formula (1) described above, $R^5$ is hydrogen or an alkyl group, more preferably an alkyl group having 1 to 30 carbons, and even more preferably an alkyl group having 1 to 20 carbons; and specifically including, e.g. a methyl group, an ethyl group, a propyl group, an isopropyl group, a butyl group, an isobutyl group, a tert-butyl group, a pentyl group, a cyclopentyl group, a hexyl group and a cyclohexyl group. Of these, $R^5$ is preferably hydrogen, a methyl group and an ethyl group.

In cases where c=0 and d=2, at least one $R^5$ is an alkyl group. Also, in the general formula (1), in cases where d is 2 or greater, $R^5$ is each independently selected.

In the general formula (1) described above, $R^6$ is each independently a hydrolyzable group, (i) an alkoxy group, more preferably an alkoxy group having 1 to 30 carbons, and even more preferably an alkoxy group having 1 to 20 carbons, or (ii) an amino group substituted with one or more alkyl groups, more preferably an amino group substituted with one or more alkyl groups having 1 to 30 carbons, more preferably an amino group substituted with one or more alkyl groups having 1 to 20 carbons.

Specifically, alkoxy groups include a methoxy group, an ethoxy group, a propoxy group, an isopropoxy group, a butoxy group and an isobutoxy group; among which preferable are a methoxy group or an ethoxy group, and particularly preferable is an ethoxy group from the viewpoint of safety. Moreover, amino groups substituted with one or more alkyl groups include, e.g. N-methylamino group, N, N-dimethylamino group, N-ethylamino group, N, N-diethylamino group and N-isopropylamino group; among which preferable are N-methylamino group or N-ethylamino group. It is to be noted that, an alkoxy group and an amino group may be bonded to silicon (Si) through a linking group such as a hydrocarbon group.

Additionally, in the general formula (1) described above, $R^7$ is hydrogen or an alkyl group, more preferably an alkyl group having 1 to 30 carbons, and even more preferably an alkyl group having 1 to 20 carbons; and specifically including, e.g. a methyl group, an ethyl group, a propyl group, an isopropyl group, a butyl group, an isobutyl group, a tert-butyl group, a pentyl group, a cyclopentyl group, a hexyl group and a cyclohexyl group; among which preferable are a methyl group and an ethyl group.

Silane compounds satisfying the general formula (1) described above may include the compounds below, whereas the present invention is not limited thereto.

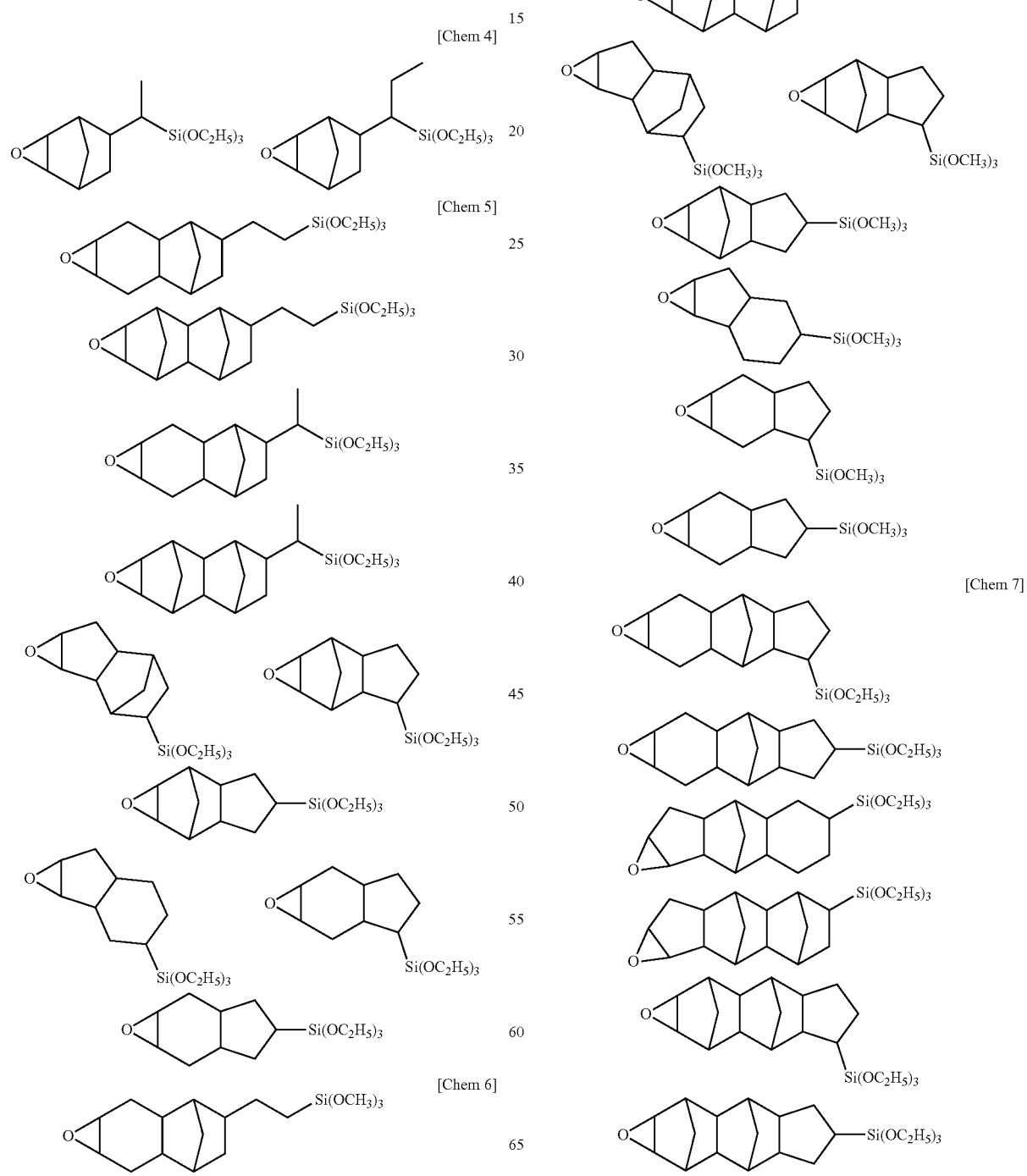

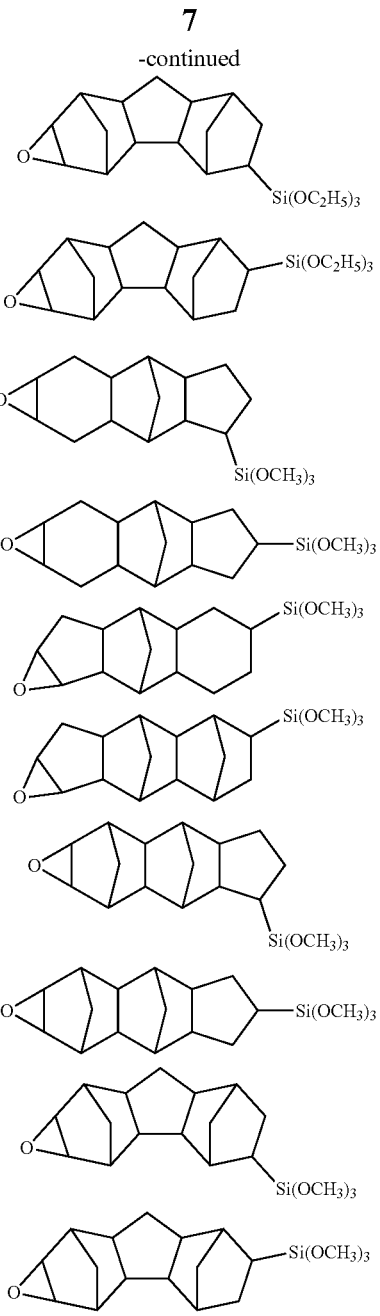

Among the silane compounds described above, particularly preferable are the silane compounds below:

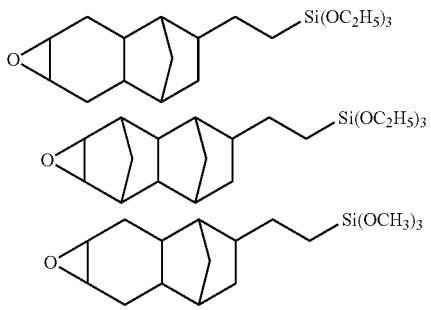

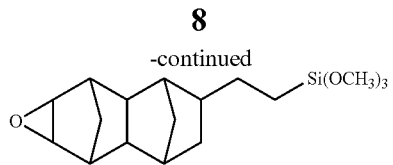

<The synthetic method for a silane compound>

In one embodiment, a silane compound according to the present invention can be obtained by subjecting an alicyclic epoxy compound having an unsaturated group, and a silane compound such as trimethoxysilane or triethoxysilane, to a hydrosilylation reaction in the presence of a hydrosilylation catalyst.

An alicyclic epoxy compound having an unsaturated group can be obtained for example by subjecting 1,4-butadiene and cyclopentadiene to the Diels-Alder reaction to produce 5-vinyl-2-norbornene (VNB), further reacting VNB with 1,4-butadiene to produce 2-ethenyl-1,2,3,4,4a,5,8,8a-octahydro-1,4-methanonaphthalene (hereinafter optionally represented as "VNBB"), and then allowing the resultant to react with a peracid such as peracetic acid. A silane compound such as trimethoxysilane or triethoxysilane to be reacted with an alicyclic epoxy compound having an unsaturated group can also be obtained, for example, by reacting the corresponding halosilane with an alcohol or amine.

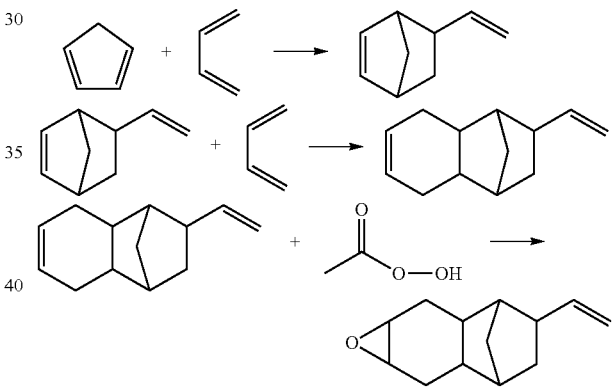

The amount of a peracid used for the synthesis of an alicyclic epoxy compound is, per 1.00 mol of the alicyclic hydrocarbon compound having an unsaturated group such as VNBB to be reacted, preferably 0.1 to 1.8 moles, and more preferably 0.5 to 1.5 moles.

(Hydrosilylation catalysts)

A hydrosilylation catalyst is a catalyst for the addition reaction of an aliphatic unsaturated group (e.g., an alkenyl group and a diene group) in one raw-material compound, and a silicon atom-bonding hydrogen atom (i.e., SiH group) in the other raw-material compound. Hydrosilylation catalysts include, for example, platinum group metal-based catalysts such as platinum-group metal simple substance or a compound thereof. A conventionally known platinum group metal-based catalyst can be employed, and specific examples thereof include, e.g. a fine-particulate platinum metal adsorbed on a carrier such as silica, alumina or silica gel; platinum chloride, chloroplatinic acid; and a solution of platinic acid hexahydrate chloride in alcohol, as well as a palladium catalyst and a rhodium catalyst, including, for example, known catalysts, e.g. Speier catalyst ($H_2PtCl_6 \cdot H_2O$), Karstedt catalyst ($Pt_2$ {[($CH_2$=CH)$Me_2$ Si]$_2$O}$_3$, and Rh catalysts such as RhCl (PPh$_3$)$_3$ RhH (PPh$_3$)$_4$, whereas preferable are those containing platinum as a platinum-group metal. Hydrosilylation catalysts may be used alone, or may be used in combination with two or more thereof.

The addition amount of a hydrosilylation catalyst may be an effective amount capable of accelerating the addition reaction. Typically, it is preferably in the range of 0.1 ppm (by mass, the same applies hereafter) to 1% by mass with respect to the total amount of raw-material compounds in terms of the amount of a platinum-group metal, more preferably in the range of 1 to 500 ppm. With the addition amount being within this range, the addition reaction is likely to be sufficiently promoted, and the rate of the addition reaction is easy to be improved with an increase in the addition amount, which helps provide economical advantages.

The method for synthesizing a silane compound according to the present invention will be more specifically described below.

In one embodiment, a solvent such as toluene is placed into a flask having a normal pressure nitrogen atmosphere, and then a transition metal catalyst solution such as, e.g. a solution of chloroplatinic acid in isopropanol is injected thereinto. Subsequently, the epoxidized product of VNBB is placed therein, which is immersed in an oil bath, and heated (for example, with the bath temperature being set to on the order of 80° C.), and then a silane compound such as triethoxysilane is dropped thereinto. At this time, the bath temperature is preferably between 20 and 120° C.

After 3 to 12 hours, the flask is removed from the oil bath, and allowed to stand to room temperature. In some cases, after washing with water and drying, the solvent is distilled off under reduced pressure, and then dried using, e.g. a vacuum dryer, whereby a silane compound satisfying the general formula (1) as described above can be obtained. A silane compound having a low purity is preferably subjected to purification by distillation or column.

[Chem 11]

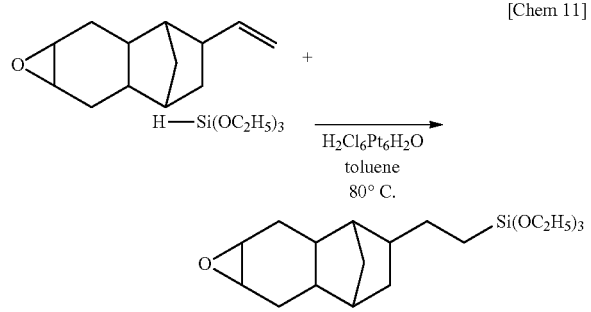

In one embodiment, a solvent such as toluene is placed into a flask having a normal pressure nitrogen atmosphere, and then a transition metal catalyst solution such as, e.g. a solution of chloroplatinic acid in isopropanol is injected thereinto. Subsequently, the epoxidized product of 5-vinyl-2-norbornene (hereinafter sometimes referred to as "VNB") is placed therein, which is immersed in an oil bath, and heated (for example, with the bath temperature being set to on the order of 80° C.), and then a silane compound such as triethoxysilane is dropped thereinto. At this time, the bath temperature is preferably between 20 and 120° C.

After 3 to 12 hours, the flask is removed from the oil bath, and allowed to stand to room temperature. In some cases, after washing with water and drying, the solvent is distilled off under reduced pressure, and then dried using, e.g. a vacuum dryer, whereby a silane compound satisfying the general formula (1) as described above can be obtained. A silane compound having a low purity is preferably subjected to purification by distillation or column.

[Chem 12]

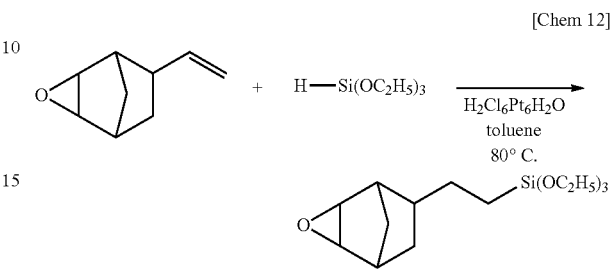

The epoxidized product of VNB can be obtained by reacting VNB with a peracid such as peracetic acid, while VNB can be obtained by the Diels-Alder reaction of 1,4-butadiene and cyclopentadiene.

In one embodiment, a solvent such as toluene is placed into a flask having a normal pressure nitrogen atmosphere, and then a transition metal catalyst solution such as, e.g. a solution of chloroplatinic acid in isopropanol is injected thereinto. Subsequently, the epoxidized product of 5-vinyl-2-cyclohexene (hereinafter sometimes referred to as "VCH") is placed therein, which is immersed in an oil bath, and heated (for example, with the bath temperature being set to on the order of 80° C.), and then a silane compound such as triethoxysilane is dropped thereinto. At this time, the bath temperature is preferably between 20 and 120° C.

After 3 to 12 hours, the flask is removed from the oil bath, and allowed to stand to room temperature. In some cases, after washing with water and drying, the solvent is distilled off under reduced pressure, and then dried using, e.g. a vacuum dryer, whereby a silane compound satisfying the general formula (1) as described above can be obtained. A silane compound having a low purity is preferably subjected to purification by distillation or column.

[Chem 13]

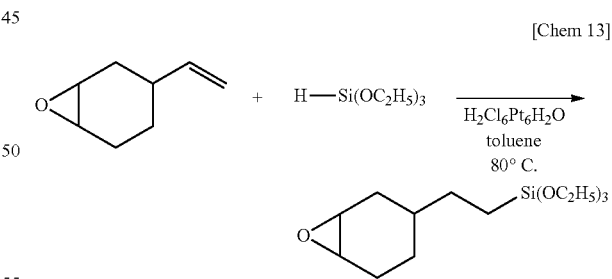

The epoxidized product of VCH can be obtained by reacting VCH with a peracid such as peracetic acid, while VCH can be obtained by the Diels-Alder reaction between a pair of butadienes.

In one embodiment, a solvent such as toluene is placed into a flask having a normal pressure nitrogen atmosphere, and then a transition metal catalyst solution such as, e.g. a solution of chloroplatinic acid in IPA is injected thereinto. Subsequently, the epoxidized product of 2-ethenyl-1,2,3,4,4a,5,8,8a-octahydro-1,4,5,8-dimethanonaphthalene (hereinafter sometimes referred to as "VDMON") obtained as described above is placed therein, which is immersed in an oil bath, and heated (for example, with the bath temperature being set to on the order of 80° C.), and then a silane compound such as triethoxysilane is dropped thereinto. At this time, the bath temperature is preferably between 20 and 120° C.

After 3 to 12 hours, the flask is removed from the oil bath, and allowed to stand to room temperature. In some cases, after washing with water and drying, the solvent is distilled off under reduced pressure, and then dried using, e.g. a vacuum dryer, whereby a silane compound satisfying the general formula (1) as described above can be obtained. A silane compound having a low purity is preferably subjected to purification by distillation or column.

[Chem 14]

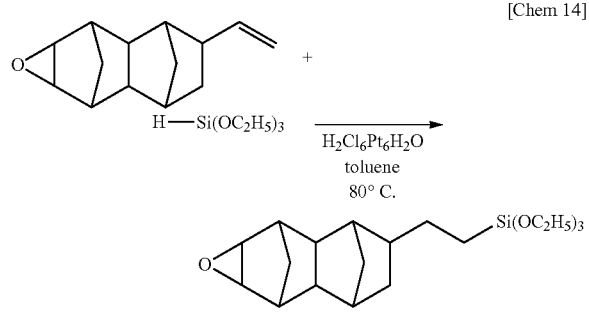

The epoxidized product of VDMON can be obtained by reacting VDMON with a peracid such as peracetic acid, while VDMON can be obtained by the Diels-Alder reaction of VNB and cyclopentadiene.

In the synthesis of a silane compound satisfying the general formula (1) by the method described above, the following silane compound may be synthesized as an impurity.

[Chem 15]

[Chem 16]

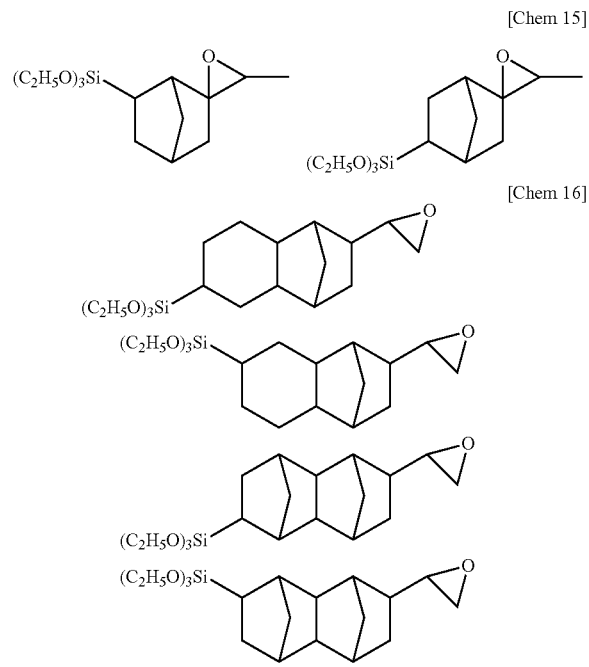

<Silane coupling agents>

A silane compound of the present invention, comprising a reactive functional group which has a low polarity and yet exhibits a high reactivity, even when used in combination with a polymer material not having, e.g. a polar group, the reactivity with such a polymer material can be maintained while having an excellent affinity (dispersibility); and therefore can be suitably used as a component of a silane coupling agent.

<Rubber compositions>

A silane compound of the present invention can be suitably used as a component of a rubber composition. A rubber composition, comprising a silane compound of the present invention, allows the hardness, tensile properties and viscoelastic properties thereof to be improved.

A rubber composition of the present invention may comprise a silane compound represented by the general formula (1), an elastomeric polymer and an inorganic material.

The content of a silane compound represented by the general formula (1) is, per 100 parts by mass of an elastomeric polymer, preferably 0.1 to 30 parts by mass, and more preferably 1 to 20 parts by mass.

(Elastomeric polymers)

An elastomeric polymer, which is typically a known natural or synthetic polymer, is not limited to a particular polymer as long as it has a glass transition point of room temperature (25° C.) or lower (i.e., being an elastomer), and may be in the form of a liquid or a solid.

As such elastomeric polymers having glass transition point of room temperature (25° C.) or lower, any rubbers which have conventionally been in common use can be employed, which may specifically include e.g. natural rubbers; isoprene rubbers, butadiene rubbers, 1,2-butadiene rubbers, styrene-butadiene rubbers, isoprene-butadiene rubbers, styrene-isoprene-butadiene rubbers, ethylene-propylene-diene rubbers, halogenated butyl rubbers, halogenated isoprene rubbers, halogenated isobutylene copolymers, chloroprene rubbers, butyl rubbers and halogenated isobutylene-p-methylstyrene rubbers; nitrile rubbers; diene-based rubbers such as chloroprene rubbers; olefin-based rubbers such as butyl rubbers, ethylene-propylene rubbers (EPDM, EPM), ethylene-butene rubbers (BBM), chlorosulfonated polyethylene, acrylic rubbers and fluororubbers, as well as epichlorohydrin rubbers, polysulfide rubbers, silicone rubbers and urethane rubbers. In addition, they may be thermoplastic elastomers, e.g. polystyrene-based elastomeric polymers (SBS, SIS, or SEBS) that may have been hydrogenated; polyolefin-based elastomeric polymers, polyvinyl chloride-based elastomeric polymers, polyurethane-based elastomeric polymers, polyester-based, or polyamide-based elastomeric polymers. It is to be noted that, these can be used alone, or as any blend. Preferable elastomeric polymers are natural rubbers; butadiene rubbers, nitrile rubbers, silicone rubbers, isoprene rubbers, styrene-butadiene rubbers, isoprene-butadiene rubbers, styrene-isoprene-butadiene rubbers, ethylene-propylene-diene rubbers, halogenated butyl rubbers, halogenated isoprene rubbers, halogenated isobutylene copolymers, chloroprene rubbers, butyl rubbers and halogenated isobutylene-p-methylstyrene rubbers; and more preferred are diene rubbers such as natural rubbers, butyl rubbers, isoprene rubbers, styrene butadiene rubbers and butadiene rubbers.

The weight average molecular weight of an elastomeric polymer is preferably 1000 to 3,000,000, and more preferably 10,000 to 1,000,000.

The glass transition temperature (Tg) of an elastomeric polymer is preferably 25° C. or lower as mentioned above, and more preferably 0° C. or lower. Preferably, with the Tg of an elastomeric polymer being within the range thereof, then a rubber composition exhibits rubber-like elasticity at room temperature. It is to be noted that, in the present invention, the Tg is a glass transition point measured by a differential scanning calorimetry (DSC-Differential Scanning calorimetry). The rate of temperature increase is preferably 10° C./min.

For example, inorganic materials include, e.g. silica, carbon black, calcium carbonate, titanium oxide clay, clay and talc; among which preferably used are silica and/or carbon black, which can lead to a further-improved mechanical property and heat resistance.

The addition amount of an inorganic material is, per 100 parts by mass of an elastomeric polymer, preferably 0.1 to 500 parts by mass, and more preferably 1 to 300 parts by mass.

A rubber composition of the present invention preferably comprises other silane compounds. The content of other silane compounds are, per 100 parts by mass of an elastomeric polymer, preferably 0.1 to 10 parts by mass, and more preferably 0.3 to 5 parts by mass.

Other silane compounds include, for example, silane compounds represented by the general formula (2) described below:

(2)

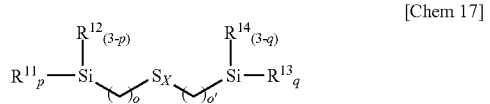

[Chem 17]

In the general formula (2) described above, X is an integer of 2 to 20, and preferably an even number of 2 to 8. Also, o and o' are each independently an integer of 1 to 10, and preferably an integer of 1 to 5. p and q are each independently an integer of 1 to 3. Also, $R^{11}$ and $R^{13}$ are each independently a hydrolyzable group, (i) an alkoxy group, more preferably an alkoxy group having 1 to 30 carbons, and even more preferably an alkoxy group having 1 to 20 carbons, or (ii) an amino group substituted with one or more alkyl groups, more preferably an amino group substituted with one or more alkyl groups having 1 to 30 carbons, more preferably an amino group substituted with one or more alkyl groups having 1 to 20 carbons. Specific examples of an alkoxy group and the like are as described above. $R^{12}$ and $R^{14}$ are each independently hydrogen or an alkyl group, more preferably an alkyl group having 1 to 30 carbons, and even more preferably an alkyl group having 1 to 20 carbons; and specifically including, e.g. a methyl group, an ethyl group, a propyl group, an isopropyl group, a butyl group, an isobutyl group, a tert-butyl group, a pentyl group, a cyclopentyl group, a hexyl group or a cyclohexyl group; among which preferable are a methyl group and an ethyl group.

Commercially available silane compounds satisfying the general formula (2) described above may be employed, including Si-69 and Si-75 manufactured by Evonik Co., Ltd.

A rubber composition comprises preferably 1 to 15% by mass, preferably 2 to 12% by mass, and more preferably 3 to 10% by mass, of other silane compounds represented by the general formula (2) described above, per 100 parts by mass of the total amount of silica contained in the rubber composition.

Besides silane compounds represented by the general formula (2) described above, silane compounds having the following structure can be employed.

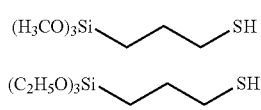

[Chem 18]

[Chem 19]

A rubber composition may comprise additives, e.g. reinforcing agents such as silica reinforcing agents and carbon black; vulcanizing agents such as sulfur and zinc oxide; crosslinking agents, vulcanization accelerators, crosslinking accelerators, vulcanization acceleration aids, anti-ageing agents, softening agents, and various oils; as well as antioxidants, anti-ageing agents, fillers and plasticizers, as long as it does not result in a loss of effectiveness thereof.

Silica reinforcing agents, include but not limited to, e.g. a white carbon by a dry method, a white carbon by a wet method, a colloidal silica, and a precipitated silica. Of these, preferable is a white carbon by a wet method containing hydrated silicic acid as a main component. Silica reinforcing agents thereof can be used in a blending amount of 10 to 300 parts by weight, each alone or in combination with two or more thereof. The specific surface areas of these silicas, by means of the nitrogen adsorption specific surface area (BET method), are suitable when being in the range of 10 to 400 $m^2/g$, preferably 20 to 300 $m^2/g$, and more preferably 120 to 190 $m^2/g$, but not limited thereto; sufficiently achieving improvements such as reinforcing property, abrasion resistance and heat build-up. Wherein, the nitrogen adsorption specific surface area is a value measured by the BET method conforming to ASTM D 3037-81.

A carbon black is selected as appropriate, and used in conformity with the application thereof. Carbon blacks are typically categorized into a hard carbon and a soft carbon on the basis of particle diameter thereof. In contrast to a soft carbon, a hard carbon is excellent in rubber-reinforcing property. A rubber composition of the present invention preferably employs a hard carbon having a particularly excellent reinforcing property. Preferably, it comprises 10 to 250 parts by weight, preferably 20 to 200 parts by weight, and more preferably 30 to 50 parts by weight per 100 parts by weight of an elastomeric polymer.

Anti-ageing agents include, e.g. hindered phenol-based, aliphatic and aromatic hindered amine-based compounds; the addition amount thereof is preferably 0.1 to 10 parts by weight, and more preferably 1 to 5 parts by weight, per 100 parts by weight of an elastomeric polymer. In addition, antioxidants include, e.g. butylhydroxytoluene (BHT), and butylhydroxyanisole (BHA). The addition amount thereof is preferably 0.1 to 10 parts by weight, and more preferably 1 to 5 parts by weight, per 100 parts by weight of an elastomeric polymer.

Colorants include inorganic pigments such as titanium dioxide, zinc oxide, ultramarine blue, red iron oxide, lithopone, lead, cadmium, iron, cobalt, aluminum, hydrochloride and sulfate, as well as azo pigments and copper phthalocyanine pigments. The addition amount thereof is preferably 0.1 to 10 parts by weight, and more preferably 1 to 5 parts by weight, per 100 parts by weight of an elastomeric polymer.

Vulcanizing agents include, e.g. sulfur-based vulcanizing agents such as a powdered sulfur, a precipitating sulfur, a highly dispersible sulfur, a surface-treated sulfur, an insoluble sulfur, dimorpholine disulfide and alkylphenol disulfide, as well as zinc oxide, magnesium oxide, litharge, p-quinone dioxane, p-dibenzoylquinonedioxinne, tetrachloro-p-benzoquinone, poly-p-dinitrobenzene, and methylenedianiline.

Vulcanization aids include fatly acids such as acetylic acid, propionic acid, butanoic acid, stearic acid, acrylic acid and maleic acid; zinc fatly acids such as zinc acetylate, zinc propionate, zinc butanoate, zinc stearate, zinc acrylate and zinc maleate; and zinc oxide.

Vulcanization accelerators include thiuram system such as tetramethylthiuram disulfide (TMTD) and tetraethylthiuram disulfide (TETD); aldehyde ammonia system such as hexamethylenetetramine; guanidine system such as diphenyl guanidine; thiazole system such as dibenzothiazyl disulfide (DM); and cyclohexylbenzothiazylsulfenamide system.

In the present invention, compounding agents and additives can be used as a rubber composition by kneading with a known rubber kneader, for example, a roll, a Banbury mixer, a kneader or the like; and vulcanizing under an optional condition. The addition amounts of compounding agents and additives thereof may also be the conventional general compounding amounts so long as they do not contradict the object of the present invention.

<Tires>

A tire can be produced by a conventionally known method using the rubber composition described above. For example, the rubber composition described above may be extruded and subsequently molded using a tire molding machine, followed by heating and pressurizing by means of a vulcanizer, to prepare a tire.

EXAMPLES

The present invention will be described in more detail below by way of examples, but this invention is not limited thereto.

Example 1

The synthesis of a silane compound 1

Into a 300 mL three-necked flask equipped with a Dimroth with a vacuum line, a ballcock, and a dropping funnel, a stir bar was placed; and using a vacuum line, while heating by means of a dryer, deaeration in the system-nitrogen substitution was repeated ten times; and thus yielding a nitrogen atmosphere under normal pressure.

Into the flask, 40 g of toluene solvent was injected using a syringe.

Then, after injecting a solution of chloroplatinic acid (0.486 mmol/g) in isopropanol (0.171 g, 0.0831 mmol) thereinto, an epoxidized product of 2-ethenyl-1,2,3,4,4a,5,8,8a-octahydro-1,4-methanonaphthalene (VNBB) (21.84 g, 0.1148 mol) was placed therein, which epoxidized product is represented by the formula (3) described below:

Thereafter, while stirring using a stirrer, the temperature was gradually increased to 80° C. Subsequently, 22.63 g (0.1378 mol) of triethoxysilane was allowed to react while being slowly added dropwise over 30 minutes using a dropping funnel.

After 5.5 hours, the flask was removed from the oil bath, and allowed to stand to room temperature. Subsequently, toluene followed by the solvent were each distilled off under reduced pressure, and then 37.85 g of a silane compound 1 was obtained (93% yield). The structures of the resulting silane compound 1 were confirmed by $^1$H-NMR and $^{13}$C-NMR measurement, the introduction rate of the silane was 100%, while confirming the disappearance of the vinyl group, a silane compound 1 of interest that has been obtained was confirmed. FIG. 1 shows the NMR chart.

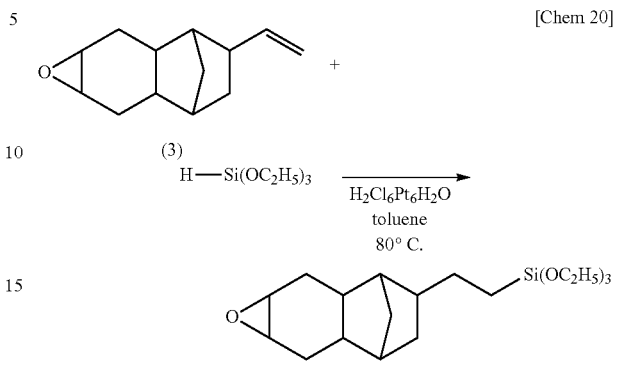

The synthesis of a rubber composition

Each of the following components was kneaded using a 100 mL kneader (Labo Plastomill manufactured by Toyo Seiki Seisaku-sho, Ltd.) to obtain a rubber composition. This rubber composition was subjected to press vulcanization at 160° C. for 15 minutes, to prepare a rubber sheet, which consists of a rubber composition and has a thickness of 1 mm.

| | |
|---|---|
| A natural rubber (RSS#3) | 100 parts by mass. |
| A silane compound 1 | 1 part by mass. |
| Other silane compounds A (trade designation: Si-69; manufactured by Evonik Co., Ltd.) | 3.2 parts by mass. |
| Silica AQ (trade designation: Nipsil AQ; manufactured by TOSOH CORPORATION) | 40 parts by mass. |
| Zinc oxide No. 3 (trade designation: Ginrei R; manufactured by Toho Zinc Co., Ltd.) | 3 parts by mass |
| Stearic acid (trade designation: Stearic acid 300; manufactured by New Japan Chemical Co., Ltd.) | 1 part by mass |
| An anti-ageing agent (trade designation: Nocrac 224; manufactured by Ouchi Shinko Chemical Industrial Co., Ltd.) | 2 parts by mass |
| Sulfur (oil treated sulfur; manufactured by Hosoi Chemical Industry Co., Ltd.) | 2 parts by mass. |
| Vulcanization accelerator (trade designation: Nocceler CZ; manufactured by Ouchi Shinko Chemical Industrial Co., Ltd.) | 1 part by mass. |
| Vulcanization accelerator (trade designation: Nocceler D; manufactured by Ouchi Shinko Chemical Industrial Co., Ltd.) | 0.5 parts by mass. |

Comparative Example 1

Except that the silane compound 1 was not contained, a rubber composition and a rubber sheet were prepared in the same manner as in Example 1.

Comparative Example 2

Except that the silane compound 1 was not contained, and that the content of the other silane compound A was changed to 4.2 parts by mass, a rubber composition and a rubber sheet were prepared in the same manner as in Example 1.

<Evaluation of physical properties>

The physical properties of the rubber sheet obtained in the above-mentioned Examples and Comparative Examples were evaluated by the following method:

(JIS-A hardness)

Six rubber sheets obtained in Example 1 were stacked, and the JIS-A hardness was measured conforming to JIS K 6353 (published in 2012). The rubber sheets obtained in Comparative Examples 1 and 2 were also measured in the same manner. Table 1 shows the measured results.

(Tensile properties)

The No. 3 dumbbell-shaped specimen was punched out from the rubber sheet obtained in Example 1, the tensile test at a tension rate of 500 mm/min was conducted conforming to JIS K 6251 (published in 2010); 100% modulus (100% Mod) [MPa], 300% modulus (300% Mod) [MPa], breaking strength (TB) [MPa], and elongation at break (EB) [%] were measured at room temperature (25° C.). The rubber sheets obtained in Comparative Examples 1 and 2 were also measured in the same manner. Table 1 shows the measured results. It is to be noted that, an elongation at break (EB) of 400% or greater may provide a good tensile property.

(Viscoelasticity)

Using a viscoelasticity measuring device (REOGEL E-4000 manufactured by UBM Co., Ltd.), conforming to JIS K 6394, under the conditions of strain of 20 μm, approximately 0.1%, and a frequency of 10 Hz, the tan δ at measurement temperatures of 0° C. and 60° C. for the rubber sheet obtained in Example 1, were obtained, and the tan δ balance (=tan δ (0° C.)/tan δ (60° C.)) was calculated from this value. The rubber sheets obtained in Comparative Examples 1 and 2 were also measured in the same manner. Table 1 shows the measured results. It is to be noted that, the higher the tan δ balance, the better the viscoelastic property is.

TABLE 1

| | | Example 1 | Comparative Example 1 | Comparative Example 2 |
|---|---|---|---|---|
| Composition of rubber composition | Natural rubber | 100 | 100 | 100 |
| | Silane compound 1 | 1 | | |
| | Other silane compound A (Si69) | 3.2 | 3.2 | 4.2 |
| Hardness | | 51 | 46 | 48 |
| Tensile property | 100% Mod | 1.68 | 1.41 | 1.53 |
| | 300% Mod | 5.6 | 4.39 | 5.1 |
| | Breaking strength (MPa) | 29.88 | 24.1 | 28.1 |
| | Elongation at break | 400% or more | 400% or more | 400% or more |
| Viscoelasticity | tanδ (0° C.) | 0.0853 | 0.0929 | 0.0916 |
| | tanδ (60° C.) | 0.0657 | 0.0794 | 0.0727 |
| | tanδ balance | 129.8 | 117 | 126 |

The invention claimed is:

1. A silane compound represented by the general formula (1) described below:

(1)
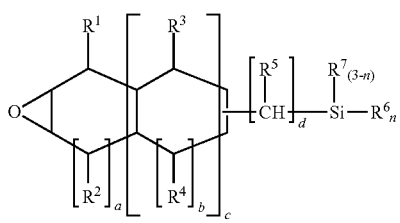

wherein $R^1$ and $R^2$ each independently represent hydrogen or an alkyl group; wherein $R^1$ and $R^2$ may form a crosslinked structure represented by —$(CH_2)_e$—;

$R^3$ and $R^4$ each independently represent hydrogen or an alkyl group; wherein $R^3$ and $R^4$ may form a crosslinked structure represented by —$(CH_2)_f$—;

$R^5$ is hydrogen or an alkyl group;

$R^6$ is an alkoxy group, or an amino group substituted with one or more alkyl groups;

$R^7$ is hydrogen or an alkyl group;

a is an integer of 1;

b is an integer of 1;

c is an integer of 1 to 3;

d is an integer of 0 to 5;

e and f are each independently an integer of 1 to 3; and n is an integer of 1 to 3.

2. The silane compound according to claim 1, the silane compound is at least one selected from the group consisting of:

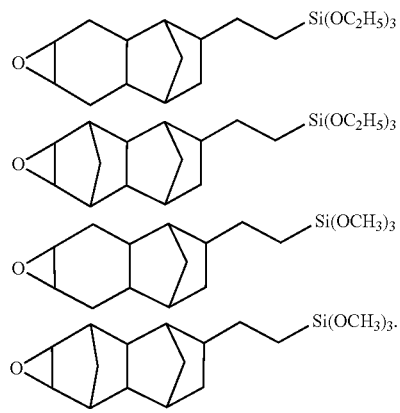

3. The silane compound according to claim 1, the silane compound is:

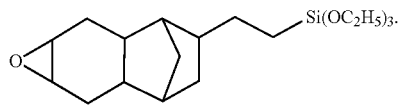

4. A rubber composition comprising the silane compound according to claim 1; an elastomeric polymer; and an inorganic material.

5. The rubber composition according to claim 4, further comprising a silane compound represented by the general formula (2) described below:

(2)
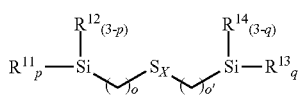

wherein X is an integer of 2 to 20;

o and o' are each independently an integer of 1 to 10;

p and q are each independently an integer of 1 to 3;

$R^{11}$ and $R^{13}$ are each independently an alkoxy group, or an amino group substituted with one or more alkyl groups; and $R^{12}$ and $R^{14}$ are each independently hydrogen or an alkyl group.

6. The rubber composition according to claim 4, wherein the content of the silane compound in said rubber composition is, per 100 parts by mass of said elastomeric polymer, 0.1 to 30 parts by mass.

7. A tire comprising the rubber composition according to claim 4.

* * * * *